United States Patent [19] [11] 4,106,008
Sakurai [45] Aug. 8, 1978

[54] METHOD AND APPARATUS FOR PRODUCING A VERTICAL CENTER LINE AND HORIZONTAL SYNCHRONIZATION SIGNALS FOR TELEVISION TYPE GAME MACHINE

[75] Inventor: Hiroshi Sakurai, Funabashi, Japan

[73] Assignee: Epoch Company, Ltd., Tokyo, Japan

[21] Appl. No.: 747,332

[22] Filed: Dec. 3, 1976

[51] Int. Cl.[2] .................... G06F 3/14
[52] U.S. Cl. .................... 340/324 AD; 273/85 G
[58] Field of Search .................... 340/324 AD, 324 A; 273/85 R, 85 G, DIG. 28

[56] References Cited

U.S. PATENT DOCUMENTS

| | | | |
|---|---|---|---|
| 2,595,646 | 5/1952 | Doba, Jr. et al. | 340/324 AD |
| 3,119,949 | 1/1964 | Greatbatch, Jr. et al. | 340/324 AD |
| 3,474,438 | 10/1969 | Lauher | 340/324 A |
| 3,659,285 | 4/1972 | Baer et al. | 340/324 AD |

*Primary Examiner*—Marshall M. Curtis
*Attorney, Agent, or Firm*—Staas & Halsey

[57] ABSTRACT

A method and apparatus for producing a vertical center line and horizontal synchronization signals for a television display device having a horizontal oscillator with a square wave output. The square wave signal is fed to two differentiation circuits. Each differentiation circuit differentiates the square wave and feeds the differentiated signal to a corresponding gate circuit, wherein each gate circuit is able to switch between an on and off state in response to the differentiated signal. A signal combination circuit combines the output signal of each gate circuit so as to provide a composite of the horizontal synchronization and vertical center line pulses to the television display device. The center line pulses are temporally centered between the horizontal synchronizing pulses because of the rising and falling edges of the square wave signal used as the triggering event for the gate circuits.

6 Claims, 8 Drawing Figures

METHOD AND APPARATUS FOR PRODUCING A VERTICAL CENTER LINE AND HORIZONTAL SYNCHRONIZATION SIGNALS FOR TELEVISION TYPE GAME MACHINE

BACKGROUND OF THE INVENTION

1. Field of the Invention

The present invention relates to an apparatus for producing a vertical center line in a television type game machine.

2. Description of the Prior Art

Traditionally, apparatus for producing a vertical center line in a television game machine has utilized the horizontal fly-back line signal of the rastor display as a trigger signal to the gate of a monostable multi-vibrator. In the prior art, the rise or fall of this trigger signal is timed so as to be located between the consecutive horizontal fly-back line signals in order to obtain proper placement of the vertical center line on the display device screen. Additional circuit stages must be used in conjunction with the monostable multi-vibrator stage in order that the center line waveform is differentiated and suitably shaped. The prior art devices for producing center lines in television-type game machines have been plagued with stability problems inherent in monostable multi-vibrator circuits. As a result, high tolerances of component values are required with consequently higher costs. Moreover, because of the additional circuitry necessary to implement the prior art apparatus, additional component, manufacturing and testing costs are incurred. The present invention overcomes the inherent high cost and complexity of the prior art by providing a simplified circuit arrangement that is more accurate, is highly stable and is less costly to construct and maintain.

SUMMARY OF THE INVENTION

In the present invention, a continuous square wave signal from a horizontal oscillator, of conventional design and suitable frequency, is utilized as the trigger signal of circuitry that provides both horizontal synchronizing pulses and center line pulses.

The square wave signal is fed to first and second differentiation circuits, each differentiation circuit differentiates the signal and produces corresponding positive going and negative going spike signals with exponential decay at each rise and fall of the square wave signal. The spike signal output from the first differentiation circuit is fed to a first gate where an active element is biased on with a low value output so that a positive going spike drives the element off, producing a high value output voltage corresponding to each rise of the square wave signal. The active element of the first gate again turns on, producing a low value of output, when the positive going spike decays to the threshold value of the element.

The spike output from the second differentiation circuit is fed to a second gate where an active element is biased off with a corresponding high output voltage value so that a negative going spike drives the element on to produce a low value output corresponding to each fall of the square wave signal. The active element of the second gate again turns off, producing a high output value when the negative going spike signal decays to the threshold value of the element.

The output signal from each of the aforesaid on-off state active elements is fed to a corresponding inverter amplifier and the output therefrom is the corresponding gate output signal which is fed to an image and synchronizing signal combination circuit. The combination circuit produces a composite signal wherein the inverted output from the first gate is the horizontal synchronizing pulse and the inverted output from the second gate is the center line pulse. Since the square wave oscillator is common to both the first and second differential gate circuits of the present invention, and since the gates change state only at the rise or fall of the square wave, the center line pulse is always centered between the horizontal synchronizing pulses. In addition to this automatic center line pulse arrangement, the present invention is less expensive to construct and maintain because of its simplified design that requires fewer components of less exact tolerances than needed in the prior art.

DESCRIPTION OF THE PREFERRED EMBODIMENT

Figure 1:
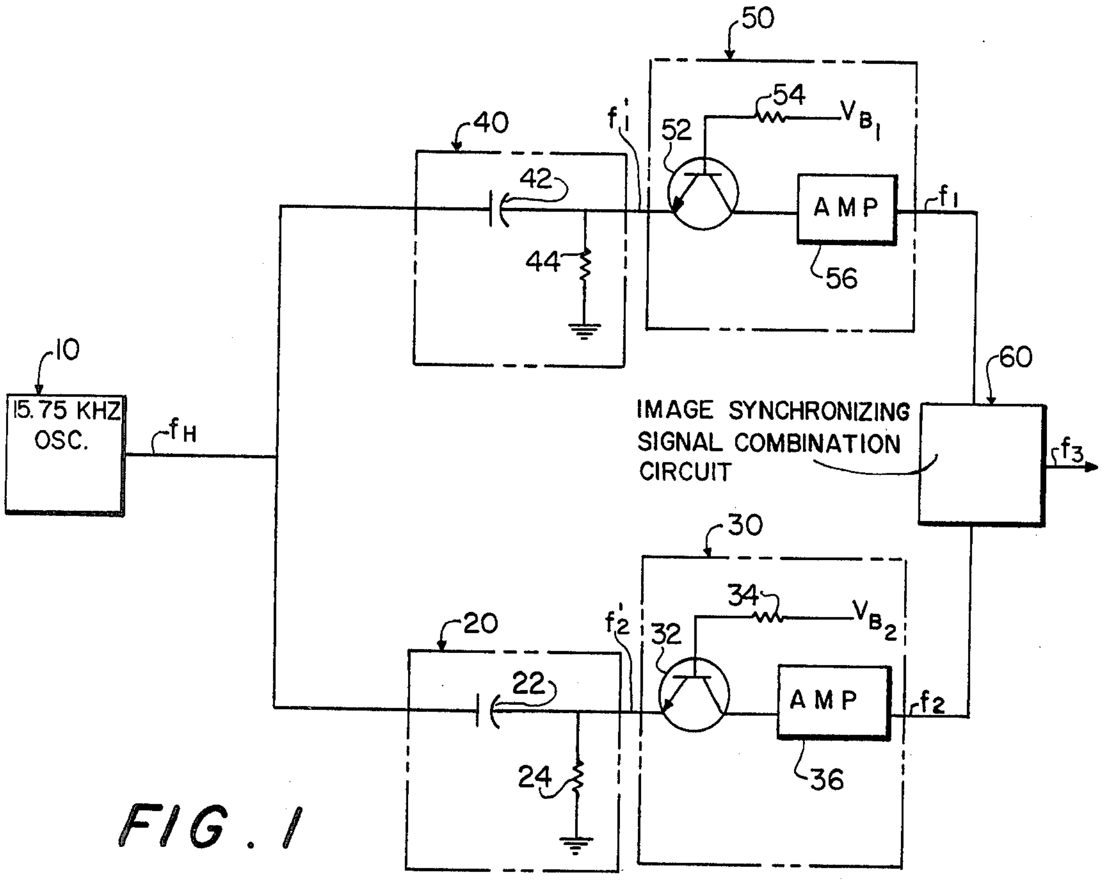
FIG. 1 is a block and schematic diagram illustrating the circuitry of the differential circuit stages and the gate stages of the present invention.

As shown in FIG. 1, the present invention includes an oscillator 10 of conventional construction that provides a continuous output signal $f_H$. The output signal $f_H$ is approximately 15.75KHz and is either a separate oscillator synchronized with the horizontal oscillator on a television receiver or is the horizontal oscillator itself. The signal $f_H$ is fed to a differentiation circuit 20 and differentiation circuit 40.

The differentiation circuit 40 provides an output signal $f_1'$ that is fed to a gate 50. Similarly, the differentiation circuit 20 provides an output signal $f_2'$ that is fed to a gate 30.

Figure 2:
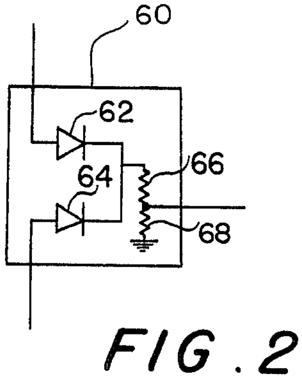
FIG. 2 is a detailed schematic of the image and synchronizing signal combination circuit shown in FIG. 1.

Gate 50 provides an output $f_1$ to an image and synchronizing signal combination circuit 60. Gate 30 also provides an output signal $f_2$ to the combination circuit 60. The combination circuit 60, shown in FIG. 2, is made up of diodes 62 and 64 having their anodes commonly connected to resistor 66 which forms part of a voltage divider with resistor 68. The circuit 60 provides a composite output signal $f_3$.

As is apparent from FIG. 1, differentiation circuit 40 comprises a capacitor 42 having one side connected to receive the signal $f_H$ and having the other side connected to a resistor 44. The differentiated $f_H$ appears at the connection between capacitor 42 and resistor 44 as signal $f_1'$.

Likewise, differentiation circuit 20 comprises a capacitor 22 having one side connected to receive the signal $f_H$ and having the other side connected to a resistor 24. The differentiated $f_H$ appears at the connection between capacitor 22 and resistor 24 as signal $f_2'$.

The gate 50 is provided with an input stage having an active circuit element 52 and an inverting amplifier 56. In this case, the active element 52 is an NPN transistor. The emitter of transistor 52 is electrically connected to receive the signal $f_1'$ while the base is electrically connected via a biasing resistor 54 to a $V_{B1}$ bias voltage supply (not shown). The collector of transistor 46 is connected with the inverting amplifier 56 which amplifies and inverts the signal to produce the output signal $f_1$.

Similarly, gate 30 is provided With an input stage having an active element 32 and an inverting amplifier 36. In this case, the active element 32 is also an NPN transistor. The emitter of the transistor 32 is electrically connected to receive the signal $f_2'$ while the base is electrically connected via a biasing resistor 34 to a $V_{B2}$ bias voltage supply (not shown). The collector of transistor 32 is electrically connected to inverting amplifier 36 which amplifies and inverts the signal to produce an output signal $f_2$.

Figure 3:
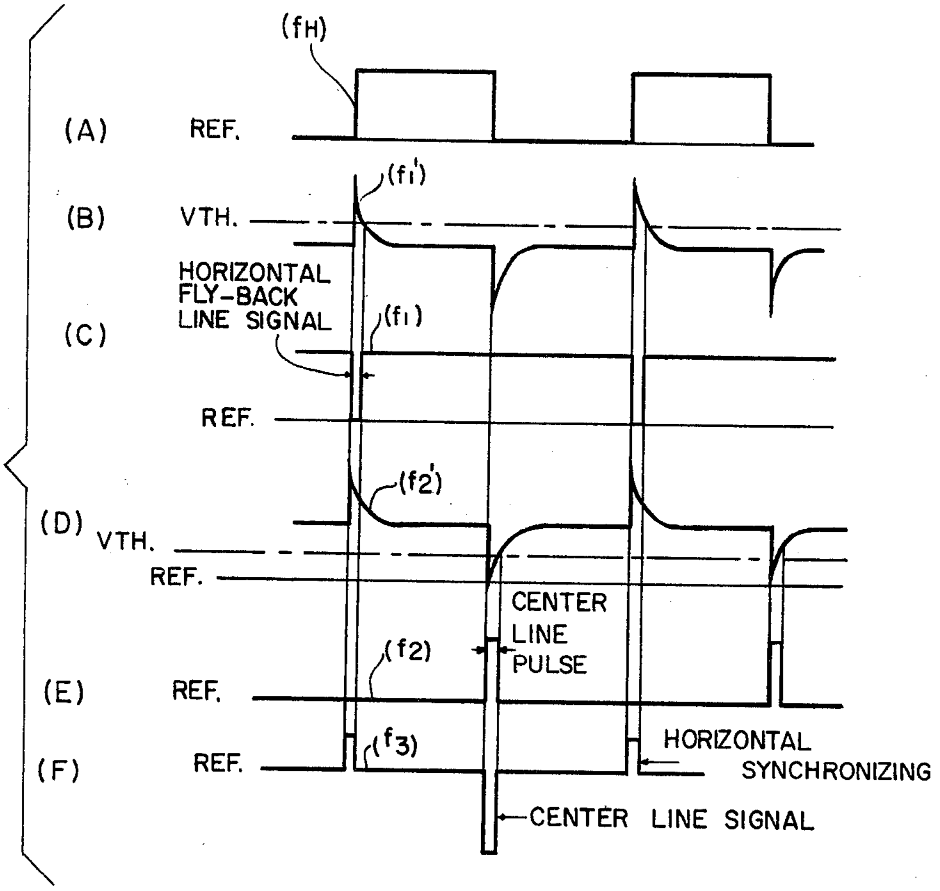
FIGS. 3A–3F illustrate the various waveforms throughout the circuit of the present invention.

Oscillator 10, shown in FIG. 1, provides a square wave output signal $f_H$, as shown in FIG. 3A. The frequency of signal $f_H$ may be, for example, 15.75KHz which, in this case, corresponds to the horizontal sweep frequency of a television receiver or a television type display device. It is recognized that this value may be adjusted to synchronize with whatever horizontal sweep frequency is desired for a display device.

In FIG. 1, it is seen that transistors 52 and 32 are each connected in common base configuration. As is well known, a transistor in the common based configuration can act as a switch and operate in either an off or an on state.

As can be seen from FIG. 1, and the associated waveforms in FIGS. 3A–3F, the transistor 52 of gate 50 is biased in a normally on state. When the square wave $f_H$ presents a positive going voltage to the capacitor 42, a differentiated waveform appears at the emitter of the transistor 52. A resultant positive going spike exceeds the threshold voltage $V_{TH}$ and causes the transistor 52 to switch to an off state thereby causing the collector voltage to shift from a low level to a high level. The inverting amplifier 56 inverts the signal appearing at the collector of transistor 52 and presents the signal $f_1$, as is shown in FIG. 3C.

In the gate circuit 30, the transistor 32 is biased in a normally off state by the biasing voltage $V_{B2}$. When the negative going spike appears at the emitter of transistor 32 due to the differentiated square wave signal $f_H$, the threshold voltage $V_{TH}$ is overcome and the transistor 32 switches to the on state thereby causing the collector voltage to be reduced to a low level until the negative spike decays to the threshold level $V_{TH}$, at which time the transistor 32 switches to the normally off state. The inverting amplifier 36 inverts the resultant negative pulse appearing at the collector of transistor 32 and produces an output signal $f_2$ which is shown in FIG. 3E as a center line pulse. The horizontal synchronizing pulse $f_1$ and the center line pulse signal $f_2$ are respectively input to the image and synchronizing signal combination circuit 60 and are output as an inverted composite signal $f_3$ as shown in FIG. 3F.

As shown in FIGS. 1 and 3A–3F, differentiation circuits 40 and 20 differentiate the rising and falling edges of the square wave output signal $f_H$ from the oscillator 10 with capacitor 42 — resistor 44 and capacitor 22 — resistor 24, respectively. The differentiated square wave output signals $f_1'$ and $f_2'$ are depicted by the spike, exponentially decaying waveforms shown in FIGS. 3B and 3D, respectively. As is well known, the rate of decay or time constant of a resistor/capacitor circuit is the product of the capacitance and the resistance values employed therein. Thus, assuming that capacitors 42 and 22 are of equal value, the resistors 44 and 24 determine the time constant of their respective differential circuits 40 and 20, in addition to biasing their corresponding transistors 52 and 32 to an on or off state.

In FIGS. 3B and 3C, it is seen that the upward spike produced by differentiating the rising edge of square wave $f_H$ moves the operating point of transistor 52 into its off state which causes the output voltage from the inverting amplifier 56 to drop to the low state. When the exponential decay of the spike passes through the $V_{TH}$ value, the transistor 52 returns to its on state and the output of the inverting amplifier 56 rises to a high state.

In FIGS. 3B and 3C, it can be further seen that the downward spike produced by the differentiation of the falling edge of square wave $f_H$, moves the operating point of the transistor 52 further into its on state. Thus, transistor 52 changes to its off state only at each rising edge of the square wave $f_H$.

It is seen from FIGS. 3D and 3E, that the downward spike produced by the differentiation of the falling edge of square wave of $f_H$ moves the operating point of transistor 32 into its on state and causes the output voltage at the output of the inverting amplifier 36 to rise to a high state. When the exponential decay of the spike passes through the $V_{TH}$ value, transistor 32 returns to its off state and the output of the inverting amplifier 36 drops to a low state. The upward spike produced by the differentiation of the rising edge of square wave $f_H$, moves the operating point of transistor 32 further into its off state. Thus, the transistor 32 moves into its on state only at each falling edge of square wave $f_H$.

The composite output signal $f_3$ is represented by the waveform shown in FIG. 3F. Because the signal $f_1$ changes state only at the rising edge of square wave $f_H$ and because the signal $f_2$ changes state only on the falling edge of square wave $f_H$, the center line pulses of signal $f_3$ are automatically temporally arranged so that the center line pulse always occurs at the same position between the horizontal synchronizing pulses for each line scan of the display.

It will be apparent that many modifications and variations may be affected without departing from the scope of the novel concept of this invention. Therefore, it is intended by the appended claims to cover all such modifications and variations which fall within the true spirit and scope of the invention.

What is claimed is:

1. Apparatus for producing a center line pulse between horizontal synchronizing pulses for a television type display device which includes a horizontal oscillator generating a horizontal synchronizing frequency and horizontal synchronizing pulses to create a raster scan, said apparatus comprising:

means for supplying a square wave signal synchronized in frequency with said horizontal synchronizing frequency;

first gate means for producing said center line pulse, said first gate means being switchable between a first state providing a relatively high output signal level and a second state providing a relatively low output level signal;

second gate means for producing said horizontal synchronization pulses, said second gate means being switchable between a first state providing a relatively high output signal level and a second state providing a relatively low output signal level;

first means for differentiating said square wave signal and providing positive and negative output signals indicative of the positive going edge and the negative going edge of said square wave at each respective occurrence, said first differentiating means being electrically connected to the input of said first gate means so as to normally bias said first gate means to said first state and also to provide said differentiated square wave output signal to said first gate means;

second means for differentiating said square wave signal and providing positive and negative output signals indicative of the positive going edge and the negative going edge of said square wave at each respective occurrence, said second differentiating means being electrically connected to the input of said second gate means so as to normally bias said second gate means to said second state and also to provide said differentiated square wave output signal to said second gate means; and means for electrically combining said output signals of said first gate means and said second gate means into a single output signal as a composite of said center line pulses and said horizontal synchronizing pulses.

2. Apparatus as in claim 1, wherein said first differentiating means has an input and an output, and includes a capacitor connected between said input and said output and a resistor connected between said output and electrical ground.

3. Apparatus as in claim 1, wherein said second differentiating means has an input and an output, and includes a capacitor connected between said input and said output and a resistor connected between said output and electrical ground.

4. Apparatus as in claim 1, wherein said first gate means includes an active element consisting of a transistor, an emitter of said active element being electrically connected to said output of said first differentiating means, a base of said active element being connected in series with a resistor to a first bias voltage, and a collector of said active element being electrically connected to a first inverter to supply said output of said first gate means.

5. Apparatus as in claim 1, wherein said second gate means includes an active element, an emitter of said active element being electrically connected to said output of said second differentiating means, a base of said active element being connected in series with a resistor to a second bias voltage, and a collector of said active element being electrically connected to a second inverter circuit to supply said output of said second gate means.

6. Apparatus as in claim 2, wherein said means for electrically combining said output signals of said first gate means and said second gate means includes a solid state diode having the cathode electrode connected to the output of said first gate means, a second solid state diode having the cathode electrode connected to the output of said second gate means, the anode electrodes of said diodes being connected together, and in turn connected to a voltage divider network consisting of a first and second resistor with said composite signal output being taken from the junction of said resistors.

* * * * *

UNITED STATES PATENT AND TRADEMARK OFFICE

CERTIFICATE OF CORRECTION

PATENT NO. : 4,106,008

DATED : August 8, 1978

INVENTOR(S) : HIROSHI SAKURAI

It is certified that error appears in the above-identified patent and that said Letters Patent are hereby corrected as shown below:

Col. 3, line 3, "With" should be --with--.

Signed and Sealed this

*Thirteenth* Day of *March 1979*

[SEAL]

*Attest:*

RUTH C. MASON
*Attesting Officer*

DONALD W. BANNER
*Commissioner of Patents and Trademarks*